United States Patent
Hirata

(10) Patent No.: US 12,024,156 B2
(45) Date of Patent: Jul. 2, 2024

(54) METHOD FOR CONTROLLING HYBRID VEHICLE AND DEVICE FOR CONTROLLING HYBRID VEHICLE

(71) Applicant: Nissan Motor Co., Ltd., Yokohama (JP)

(72) Inventor: Takeshi Hirata, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/277,736

(22) PCT Filed: Feb. 18, 2021

(86) PCT No.: PCT/IB2021/000108
§ 371 (c)(1),
(2) Date: Aug. 17, 2023

(87) PCT Pub. No.: WO2022/175702
PCT Pub. Date: Aug. 25, 2022

(65) Prior Publication Data
US 2024/0092339 A1    Mar. 21, 2024

(51) Int. Cl.
*B60W 20/13* (2016.01)
*B60W 10/06* (2006.01)
(Continued)

(52) U.S. Cl.
CPC ............ *B60W 20/13* (2016.01); *B60W 10/06* (2013.01); *B60W 20/12* (2016.01); *B60W 10/26* (2013.01); *B60W 2710/244* (2013.01)

(58) Field of Classification Search
CPC ...... B60W 20/12; B60W 20/15; B60W 20/20; B60W 50/0097; B60W 2510/0676; B60W 20/13; B60W 2710/244; F02N 2300/2006
See application file for complete search history.

(56) References Cited

U.S. PATENT DOCUMENTS

| | | | | |
|---|---|---|---|---|
| 2013/0124028 A1* | 5/2013 | Ang | ...................... | B60W 20/15 180/65.265 |
| 2014/0180519 A1* | 6/2014 | Niimi | ..................... | B60W 20/12 903/904 |

(Continued)

FOREIGN PATENT DOCUMENTS

| | | | | |
|---|---|---|---|---|
| EP | 1564403 A2 * | 8/2005 | ............ | B60W 10/06 |
| JP | 2009029154 A * | 2/2009 | ............ | B60W 20/00 |

(Continued)

OTHER PUBLICATIONS

EPO machine translation of JP 2011-148439A (original JP document filed Aug. 4, 2011) (Year: 2011).*

(Continued)

*Primary Examiner* — David A Testardi
(74) *Attorney, Agent, or Firm* — Young Basile Hanlon & MacFarlane, P.C.

(57) ABSTRACT

A method for controlling a hybrid vehicle executes control in which a state of charge of the battery at a time point at which the hybrid vehicle reaches a destination is lower than an upper limit state of charge by executing an EV mode until the hybrid vehicle reaches the destination. During execution of the control, if an estimated value of a lowest temperature of an engine coolant until the hybrid vehicle reaches the destination is equal to or higher than a first threshold value, the EV mode is started when the EV mode is continuable to the destination, and if the estimated value of the lowest temperature is lower than the first threshold value, a section for executing the EV mode is shortened compared to when the estimated value of the lowest temperature is equal to or higher than the first threshold value.

8 Claims, 10 Drawing Sheets

(51) Int. Cl.
  *B60W 20/12*  (2016.01)
  *B60W 10/26*  (2006.01)

(56) References Cited

U.S. PATENT DOCUMENTS

| | | | |
|---|---|---|---|
| 2015/0217757 A1 | 8/2015 | Okamoto | |
| 2016/0159339 A1* | 6/2016 | Cho | B60K 6/442 |
| | | | 180/65.265 |
| 2016/0264124 A1* | 9/2016 | Hotta | B60W 50/0097 |
| 2016/0347303 A1 | 12/2016 | Murata et al. | |
| 2017/0120888 A1 | 5/2017 | Jinno | |
| 2017/0190235 A1* | 7/2017 | Yoo | B60H 1/034 |
| 2017/0341487 A1* | 11/2017 | Lee | F02N 11/0829 |
| 2018/0111618 A1* | 4/2018 | Morimoto | B60W 10/26 |
| 2018/0162235 A1* | 6/2018 | Park | B60W 20/15 |
| 2018/0170194 A1* | 6/2018 | Ichikawa | B60W 10/26 |
| 2018/0170360 A1* | 6/2018 | Kim | B60W 10/08 |
| 2019/0001960 A1* | 1/2019 | Lee | B60W 50/0097 |
| 2019/0031182 A1* | 1/2019 | Park | B60W 20/40 |
| 2019/0070972 A1* | 3/2019 | Lee | B60W 10/26 |
| 2019/0100193 A1* | 4/2019 | Park | B60K 6/442 |
| 2019/0126907 A1* | 5/2019 | Park | B60W 20/16 |
| 2019/0168739 A1 | 6/2019 | Morisaki | |
| 2020/0156619 A1* | 5/2020 | Izuoka | B60W 50/0097 |
| 2020/0164855 A1* | 5/2020 | Hashimoto | H02J 7/1415 |
| 2021/0179068 A1* | 6/2021 | Park | F02D 29/02 |
| 2021/0253079 A1* | 8/2021 | Eto | B60L 58/12 |
| 2021/0402974 A1* | 12/2021 | Lee | B60W 10/08 |
| 2022/0106902 A1* | 4/2022 | Kumano | F01P 7/16 |
| 2022/0118821 A1* | 4/2022 | Shin | B60W 30/192 |
| 2022/0136450 A1* | 5/2022 | Song | B60H 1/004 |
| | | | 701/102 |

FOREIGN PATENT DOCUMENTS

| | | | | |
|---|---|---|---|---|
| JP | 2010089718 A | * | 4/2010 | |
| JP | 2011-148439 A | | 8/2011 | |
| JP | 2013001214 A | * | 1/2013 | |
| JP | 2015-145157 A | | 8/2015 | |
| JP | 2015-147498 A | | 8/2015 | |
| JP | 2016-083958 A | | 5/2016 | |
| JP | 2016083958 A | * | 5/2016 | B60K 11/04 |
| JP | 2017-081416 A | | 5/2017 | |
| JP | 2019-099076 A | | 6/2019 | |

OTHER PUBLICATIONS

EPO search opinion and supplementary search report for EP 4296130 (EP 21 926 061.9), dated Feb. 1, 2024, 3 pages (Year: 2024).*
China First Office Action 202180093905.6 dated Mar. 25, 2024, 5 pages (Year: 2024).*
China First Office Action 202180093905.6 dated Mar. 25, 2024, translated, 5 pages (Year: 2024).*

* cited by examiner

METHOD FOR CONTROLLING HYBRID VEHICLE AND DEVICE FOR CONTROLLING HYBRID VEHICLE

TECHNICAL FIELD

The present invention relates to control of a hybrid vehicle.

BACKGROUND ART

JP 2017-81416 A discloses, as control of a hybrid vehicle, control that prioritizes traveling by electric energy in order to reduce a state of charge of a battery when reaching a parking spot when there is the parking spot on a traveling route where a parking time is expected to be longer than a threshold value. A reason for reducing the state of charge is to increase utilization efficiency of "cold charging" in which the battery is charged using a driving force of an engine that drives for warming up during traveling after the hybrid vehicle is parked for a long time.

SUMMARY OF INVENTION

Incidentally, if the hybrid vehicle continues to travel in an engine stopping state in order to reduce the state of charge, an engine coolant temperature decreases. In a general hybrid vehicle, when the engine coolant temperature reaches a lower limit value at which performance of a heating device or a defroster device can be ensured while the engine is stopped, the engine is restarted. That is, in the control of the patent literature, as the engine coolant temperature drops, the engine may restart, and it may be impossible to lower the state of charge as intended. On the other hand, when the engine stopping state is maintained even after the engine coolant temperature reaches the lower limit value, the performance of the heating device or the defroster device is degraded.

Therefore, an object of the present invention is to reduce a state of charge before a target position without degrading performance of a heating device or a defroster device.

According to one embodiment of the present invention, a method for controlling a hybrid vehicle, the hybrid vehicle including an engine, a power generating motor generator that is driven by the engine and generates electric power, a traveling motor generator, and a battery that is charged by the electric power generated by the power generating motor generator and supplies the electric power to the traveling motor generator, is provided. In this control, a controller executes a state of charge reducing control in which a state of charge of the battery at a time point at which the hybrid vehicle reaches a destination is lower than an upper limit state of charge by providing a section for executing an EV mode in which the engine is stopped and the hybrid vehicle travels by the traveling motor generator until the hybrid vehicle reaches the destination. During execution of the state of charge reducing control, if an estimated value of a lowest temperature of an engine coolant until the hybrid vehicle reaches the destination, assuming that the EV mode is continued to the destination, is equal to or higher than a first threshold value, the controller starts the EV mode when the EV mode is continuable to the destination and executes the EV mode until the hybrid vehicle reaches the destination, and if the estimated value of the lowest temperature is lower than the first threshold value, the controller shortens a section for executing the EV mode compared to when the estimated value of the lowest temperature is equal to or higher than the first threshold value.

DESCRIPTION OF EMBODIMENTS

Hereinafter, embodiments of the present invention will be described with reference to the drawings.

First Embodiment

Figure 1:
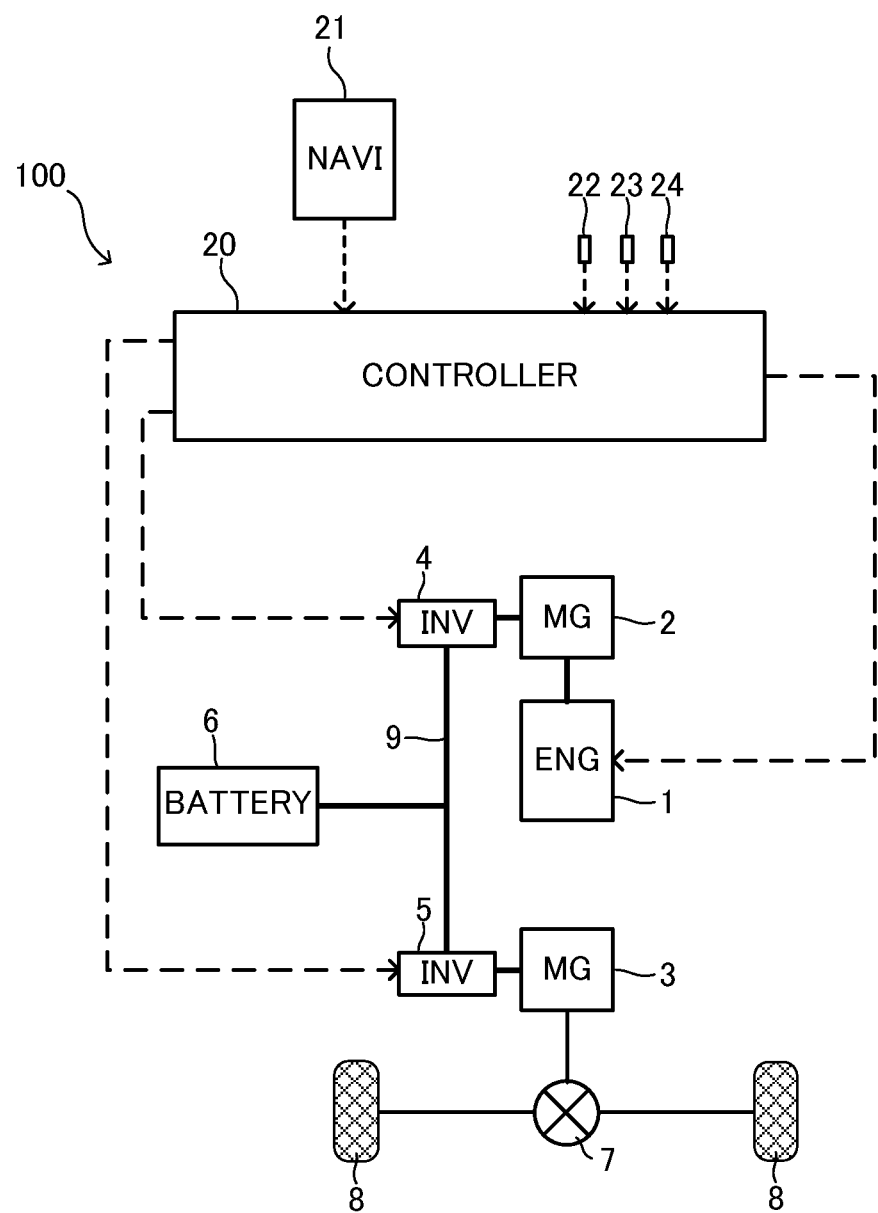
FIG. 1 is a schematic configuration diagram of a hybrid vehicle.
Figure 2:
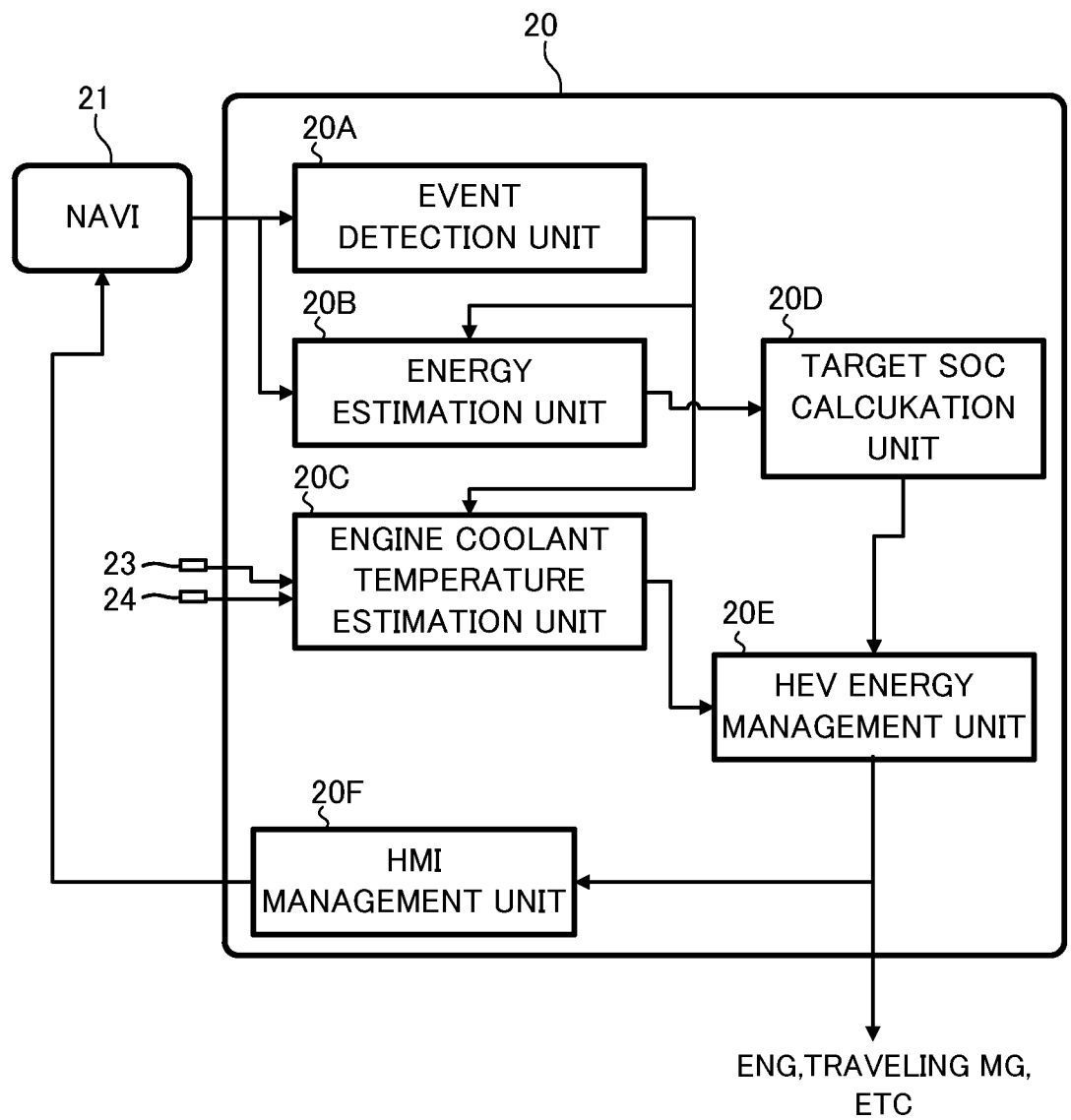
FIG. 2 is a schematic configuration diagram of a controller.

FIG. 1 is a schematic configuration diagram of a hybrid vehicle 100. FIG. 2 is a schematic configuration diagram of a controller 20.

The hybrid vehicle includes an engine 1, a power generating motor generator 2, a traveling motor generator 3, a first inverter 4, a second inverter 5, a battery 6, a differential mechanism 7, a driving wheel 8, and a controller 20. Hereinafter, the hybrid vehicle 100 is referred to as a vehicle 100, and the motor generator is referred to as MG.

The engine 1 is an internal combustion engine such as a gasoline engine or a diesel engine. The engine 1 is connected to the power generating MG2 via a speed reduction mechanism (not shown). The power generating MG2 is driven by the engine 1 and generates electric power. The traveling MG3 is connected to the driving wheel 8 via the differential mechanism 7. The traveling MG3 drives the vehicle 100 and performs regenerative power generation during deceleration.

The power generating MG2 and the traveling MG3 form a high-voltage circuit 9 together with the first inverter 4, the second inverter 5, the battery 6, and the like. The first inverter 4 is used for controlling the power generating MG2, and the second inverter 5 is used for controlling the traveling MG3. Each of the first inverter 4 and the second inverter 5 generates a three-phase alternating current based on a command from the controller 20, and applies the generated three-phase alternating current to the corresponding MG of the power generating MG2 and the traveling MG3. The first inverter 4 and the second inverter 5 may be integrated. The battery 6 constitutes a power source of the power generating MG2 and the traveling MG3. The battery 6 is charged by the electric power generated by the power generating MG2 and electric power regeneratively generated by the traveling MG3.

The controller 20 is implemented by one or a plurality of microcomputers including a central processing unit (CPU), a read-only memory (ROM), a random access memory (RAM), and an input/output interface (I/O interface). The controller 20 integrally controls the engine 1, the first inverter 4, the second inverter 5, and the like by executing a program stored in the ROM or the RAM by the CPU.

The controller 20 receives signals from an SOC sensor 22 that detects a state of charge (SOC) of the battery 6, a coolant temperature sensor 23 that detects a temperature of a coolant in the engine 1, an outside air temperature sensor 24 that detects a temperature outside the vehicle, and various sensors and switches. Further, various information, which will be described later, is input to the controller 20 from the navigation system 21. These signals and information are used for control performed by the controller 20.

The controller 20 has an EV mode and a series hybrid mode (hereinafter referred to as a series HEV mode) as traveling modes of the vehicle 100. The EV mode is a mode in which the engine 1 is stopped, the traveling MG3 is driven by the electric power supplied from the battery 6, and the vehicle travels by a driving force only from the traveling MG3. The series HEV mode is a mode in which the engine 1 is driven to drive the traveling MG3 while generating the electric power by the power generating MG2.

The controller 20 selects a traveling mode based on an accelerator position (accelerator opening degree) APO, a brake pedal depression force BPF, and a vehicle speed VSP with reference to a traveling mode selection map (not shown), and drives the engine 1 and the traveling MG3 so as to achieve the selected traveling mode. In a case in which an EV mode switch capable of selecting the EV mode by an operation of a driver is provided, when the driver selects the EV mode, the EV mode is preferentially executed.

As described above, a hybrid system of the vehicle 100 shown in FIG. 1 is a series hybrid system in which the engine 1 is exclusively used for driving the power generating MG2 and the driving wheel 8 is exclusively driven by the traveling MG3. However, the present embodiment is also applicable to a parallel hybrid system in which the engine 1 is also used for driving the driving wheel 8. In the case of the parallel hybrid system, similarly to the series hybrid system, the engine 1 is stopped in the EV mode, and the engine 1 is operated in the HEV mode.

FIG. 2 is a schematic configuration diagram of the controller 20. FIG. 2 shows a part of functions of the controller 20 as a block diagram, and each block does not mean a physical configuration.

The controller 20 includes an event detection unit 20A, an energy estimation unit 20B, an engine coolant temperature estimation unit 20C, a target SOC calculation unit 20D, an HEV energy management unit 20E, and an HMI management unit 20F.

Map information for each predetermined section is input from the navigation system 21 to the event detection unit 20A and the energy estimation unit 20B. The map information includes, for example, a road gradient, a statistical average vehicle speed, a speed limit, a distance to a destination, and the like. Further, the event detection unit 20A and the energy estimation unit 20B also receive information related to a function activated by the driver via an interface device such as a display.

The event detection unit 20A detects event information on a traveling route to the destination based on the input information. The event information is, for example, information related to an event affecting control of output, a speed, and the like of the vehicle 100, such as the presence or absence of an uphill road or a downhill road, the presence or absence of an intersection, a crosswalk, or the like, whether a road is an expressway, whether the vehicle 100 has reached the destination, and the like. These pieces of event information are output to the energy estimation unit 20B and the engine coolant temperature estimation unit 20C.

Based on the information input from the navigation system 21 and the event information detected by the event detection unit 20A, the energy estimation unit 20B estimates power usage, a regeneration amount, and an electric power generation amount until the vehicle reaches the destination. An estimation result is output to the target SOC calculation unit 20D.

The engine coolant temperature estimation unit 20C estimates a transition of an engine coolant temperature Tcl until the vehicle reaches the destination based on the event information detected by the event detection unit 20A, a detection value of the coolant temperature sensor 23, and a detection value of the outside air temperature sensor 24. The estimation result is output to the HEV energy management unit 20E.

The target SOC calculation unit 20D calculates a target SOC of the battery 6 based on the estimation result obtained by the energy estimation unit 20B. For example, when there is an uphill road or an expressway ahead, an upper limit SOC or an SOC close to the upper limit SOC is set as the target SOC in order to cope with high output. Further, when there is a downhill road ahead, since a margin for receiving regenerative electric power on the downhill road is provided, the target SOC before entering the downhill road is set low. The target SOC is output to the HEV energy management unit 20E.

The HEV energy management unit 20E determines operation and stop, and an operating point of the engine 1, an operating point of the traveling MG3, and the like based on the input information, and controls the engine 1 and the traveling MG3 based on these. Information such as the operating point of the engine 1 is output to the HMI management unit 20F.

The engine 1 basically operates and stops in accordance with the selected traveling mode. However, even if the HEV mode is selected, when the SOC of the battery 6 reaches the upper limit SOC, the engine 1 is stopped, and even if the EV mode is selected, when the SOC reaches a lower limit SOC, the engine 1 is operated. The upper limit SOC and the lower limit SOC are set in advance from the viewpoint of preventing deterioration of the battery 6. Further, in a case in which the EV mode is selected, when the engine coolant temperature Tcl has decreased to a threshold value, the engine 1 is operated. This is to ensure functions of the defroster device and the heating device using an engine coolant as a heat source. The engine 1, which is operated in response to a decrease in the engine coolant temperature Tcl, stops when the engine coolant temperature Tcl rises to a predetermined temperature. As described above, control of operating and stopping the engine 1 according to the SOC of the battery 6 and the engine coolant temperature Tcl is referred to as normal control.

The HMI management unit 20F generates information on an operation state of each application based on the information determined by the HEV energy management unit 20E, and displays the information on the interface device such as a display via the navigation system 21.

Incidentally, in a case in which the hybrid system is started when the engine 1 is in a cold machine state, the controller 20 operates the engine 1 to warm up, that is, to raise temperatures of the engine 1 main body and the engine coolant, promote activation of an exhaust gas purification catalyst, and the like. At this time, by causing the engine 1 to drive the power generating MG2, the battery 6 is also charged. Considering efficiency of the entire hybrid system, it is desirable to operate the engine 1 not only to warm up but also to charge the battery 6, rather than operating the engine 1 only to charge the battery 6. However, when the SOC of the battery 6 reaches the upper limit SOC at a start of the system, the battery 6 cannot be charged during the warm-up.

Therefore, in a case in which the vehicle is expected to be parked for a long time such that the engine 1 is in the cold machine state or a state close to the cold machine state after the vehicle reaches the destination, the controller 20 positively performs the EV mode in order to sufficiently reduce the SOC of the battery 6 before the vehicle reaches the destination. The control of positively performing the EV mode in order to sufficiently reduce the SOC of the battery 6 is referred to as state of charge reducing control. The case in which the vehicle is expected to be parked for a long time is, for example, a case in which the destination is home, that is, a case in which the driver comes home from an outing destination, a case in which the destination is an accommodation facility of a travel destination, or the like.

However, since the engine 1 is stopped in the EV mode, the engine coolant temperature Tcl decreases. Therefore, when a time for which the EV mode is performed becomes long, performance of the heating device and the defroster device may be degraded due to the decrease in the engine coolant temperature Tcl. According to the normal control described above, since the engine 1 is operated when the engine coolant temperature Tcl decreases, performance degradation of the heating device and the like can be prevented, but at the same time, since the power generating MG2 also generates the electric power, the SOC of the battery 6 cannot be sufficiently reduced.

Therefore, the controller 20 executes control to be described below in order to sufficiently reduce the SOC of the battery 6 before the vehicle reaches the destination and to prevent the performance degradation of the heating device and the defroster device.

Figure 3:
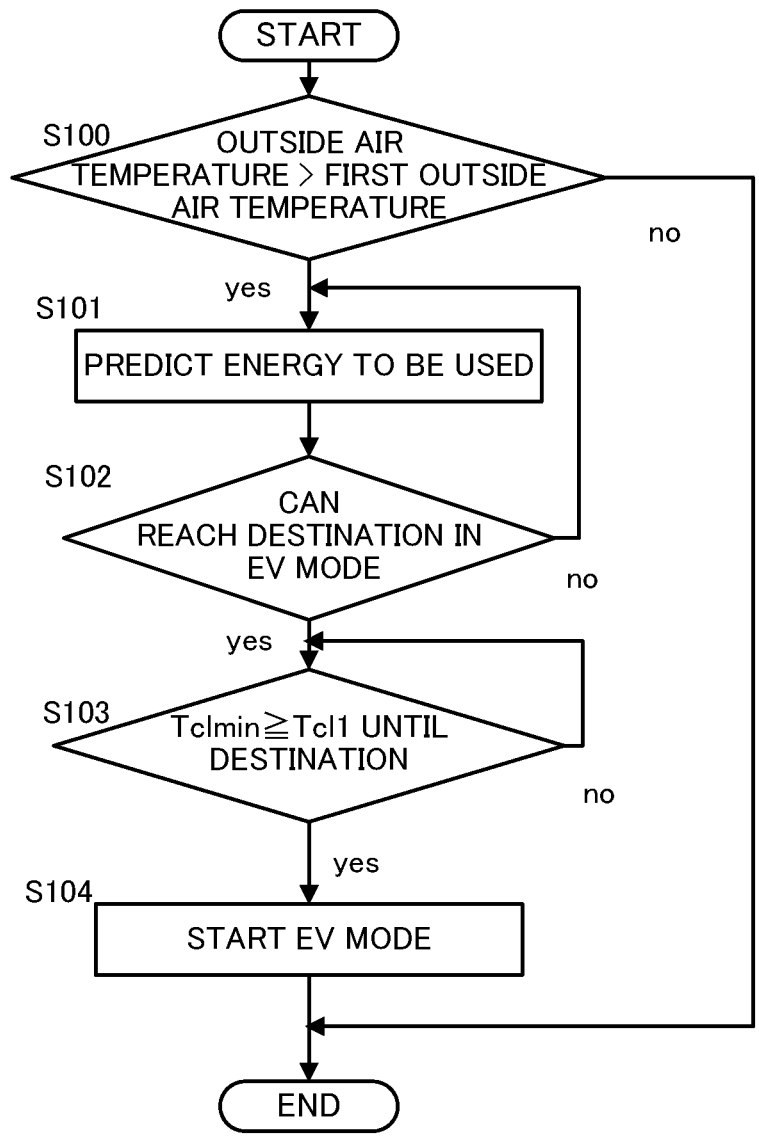
FIG. 3 is a flowchart of state of charge reducing control according to a first embodiment.

FIG. 3 is a flowchart showing a control routine of the state of state of charge reducing control in the present embodiment.

In the present control routine, in a case in which it is necessary to reduce the SOC of the battery 6 before the vehicle reaches the destination, when the EV mode is executed from there to the destination, it is estimated how far the engine coolant temperature Tcl is decreased, and when it is estimated that the engine coolant temperature Tcl falls below a first threshold value Tcl1, a section in which the EV mode is performed is reduced. The present control routine starts when detailed event information up to the destination is input from the navigation system 21. Since the detailed event information is input, for example, for each section of several kilometers, the present control routine is started at a position several kilometers from the destination. A travelable distance in the EV mode under a predetermined travel condition may be obtained in advance based on a capacity of the battery 6, and the present control routine may be started when a distance to the destination is equal to or less than the travelable distance. The engine 1 is operated under the above-described normal control until the EV mode is started by the present control routine.

Since the present control routine is based on a premise that the engine 1 is in the cold machine state due to parking for a long time after the vehicle reaches the destination, when the destination set by the driver is a place where it is clear that the parking for a long time is not performed, it is not necessary to execute the present control routine. Hereinafter, a description will be made in accordance with the steps.

In step S100, the controller 20 determines whether an outside air temperature is higher than a first outside air temperature, which is a threshold value for determination, and when the outside air temperature is higher than the first outside air temperature, a process of step S101 is executed, and when the outside air temperature is below the first outside air temperature, this routine ends. The first outside air temperature is the preset threshold value for determination, and is an air temperature at which the engine 1 may be in the cold machine state during the parking after the vehicle reaches the destination.

In step S101, the controller 20 predicts energy (electric power) to be used up to the destination based on the event information when it is assumed that the EV mode is executed from there to the destination. For example, in the traveling route to the destination, the longer the section of the uphill road, the greater the energy consumption, and the more events involving stop and start, such as intersections and crosswalks, the greater the energy consumption. On the other hand, the longer the section of the downhill road, the smaller the energy consumption, and the longer the section where the vehicle can travel at a constant vehicle speed, the smaller the energy consumption.

In step S102, the controller 20 determines whether the vehicle can reach the destination in the EV mode, when the vehicle can reach the destination, a process of step S103 is executed, and when the vehicle cannot reach the destination, a process of step S101 is repeated.

In step S103, the controller 20 predicts a minimum engine coolant temperature Tclmin until the vehicle reaches the destination when it is assumed that the EV mode is executed until the vehicle reaches the destination, and determines whether the minimum engine coolant temperature Tclmin is equal to or higher than the first threshold value Tcl1. The first threshold value Tcl1 is, for example, a lower limit temperature at which the heating device and the defroster device can satisfy required performance.

When the controller 20 determines in step S103 that the minimum engine coolant temperature Tclmin is equal to or higher than the first threshold value Tcl1, the controller 20 executes a process of step S104, and otherwise, repeats the process of step S103.

In step S104, the controller 20 starts the EV mode and continues the EV mode until the vehicle reaches to the destination.

Next, an effect of executing the control routine will be described.

Figure 4:
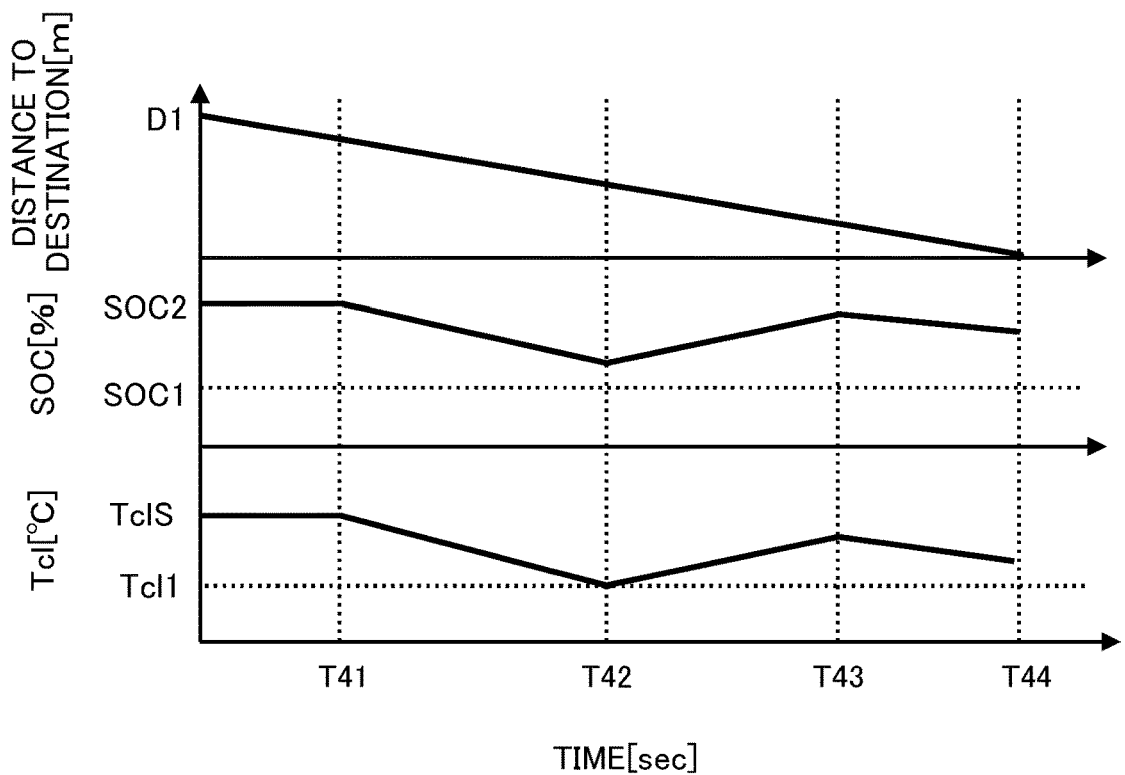
FIG. 4 is a timing chart as a comparative example.
Figure 5:
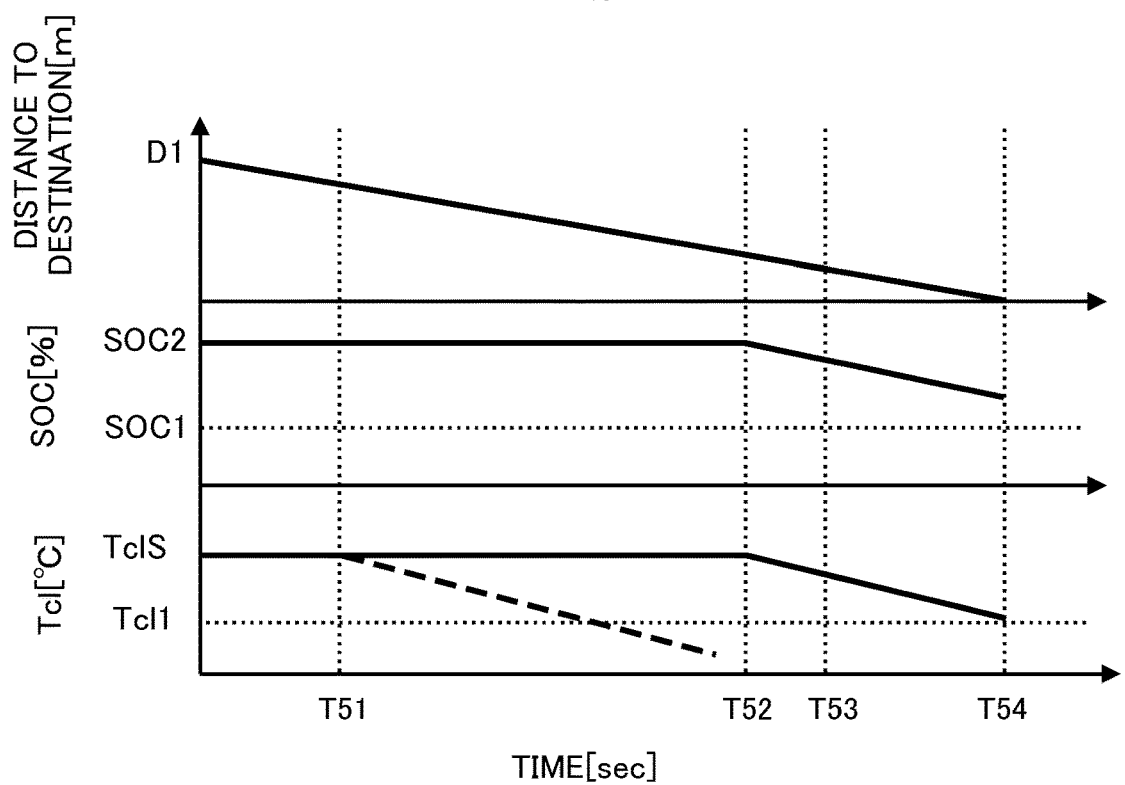
FIG. 5 is an example of a timing chart when the control in FIG. 3 is executed.

FIG. 4 is a timing chart when state of charge reducing control according to a comparative example is executed. The state of charge reducing control according to the comparative example determines whether the EV mode is executable based only on the SOC of the battery 6 without considering a temperature of engine cooling water until the vehicle reaches the destination. FIG. 5 is a timing chart when the state of charge reducing control according to the present embodiment is executed. In both of FIGS. 4 and 5, it is assumed that a control routine is started when a distance to a destination is D1 [m], and it is possible to reach the destination in an EV mode at a timing T41 and a timing T51.

In the control according to the comparative example, as shown in FIG. 4, the EV mode is started at the timing T41 at which the vehicle can reach the destination in the EV mode. Therefore, the engine 1 is started at a timing T42 at which the engine coolant temperature Tcl has reached the first threshold value Tcl1. In the normal control of the engine 1, when the engine is started to maintain an engine coolant temperature, the engine 1 continues to operate until the engine coolant temperature Tcl is increased by a predetermined amount. Further, at a timing T43 at which the engine coolant temperature Tcl has increased by the predetermined amount, the EV mode is resumed.

On the other hand, in the control according to the present embodiment, as shown in FIG. 5, when the EV mode is started at the timing T51, the controller 20 predicts that the minimum engine coolant temperature Tclmin falls below the first threshold value Tcl1 as indicated by a broken line in the drawing, and therefore, the EV mode is not started at the timing T51. Further, at a timing T52, when the controller 20 determines that the minimum engine coolant temperature Tclmin does not fall below the first threshold value Tcl1 even if the EV mode is executed until the vehicle reaches the destination, the EV mode is started. That is, when the minimum engine coolant temperature Tclmin falls below the first threshold value Tcl1 before the vehicle reaches the destination, a section in which the EV mode is executed is short and a start timing of the EV mode is delayed, as compared with the case in which the vehicle determines that the minimum engine coolant temperature Tclmin does not fall below the first threshold value Tcl1. A length of the section in which the EV mode is executed when the minimum engine coolant temperature Tclmin is lower than the first threshold value Tcl1 is a length with which the engine coolant temperature Tcl at the time of reaching the destination is equal to or higher than the first threshold value Tcl1.

As described above, in the control according to the comparative example, it is troublesome control of restarting the once-stopped engine 1 and then stopping the engine 1 again. On the other hand, in the control according to the present embodiment, after the EV mode is started, the engine 1 does not operate until the vehicle reaches the destination.

In the control according to the comparative example, when a timing at which the engine 1 restarts is a time at which the vehicle is close to the destination, there is a concern that the SOC of the battery 6 may not sufficiently decrease before the vehicle reaches the destination. On the other hand, in the control according to the present embodiment, at a timing T54 at which the vehicle reaches the destination, the SOC of the battery 6 can be decreased to an SOC1 sufficiently lower than an upper limit SOC (SOC2 in the figure), and the engine coolant temperature Tcl can be maintained higher than the first threshold value Tcl1 until the vehicle reaches the destination.

Further, in the control according to the comparative example, a section in which the engine coolant temperature Tcl is lower than a reference temperature TclS maintained by normal control, that is, a section in which performance of the heating device or the defroster device is lower than that in the normal control, continues from the timing T41 to a time of reaching the destination. On the other hand, in the control according to the present embodiment, the section in which the engine coolant temperature Tcl is lower than the reference temperature TclS continues from the timing T52 to the time of reaching the destination, and is shorter than that in the case of the control according to the comparative example.

The control according to the present embodiment shortens the section in which the EV mode is executed in accordance with the engine coolant temperature Tcl, but this "shorten" includes not executing the EV mode. For example, as in the case in which the vehicle is traveling in an extremely low temperature environment, in a case in which the section in which the EV mode can be executed becomes very small since the engine coolant temperature Tcl immediately falls below the first threshold value Tcl1 when the engine 1 is stopped, the EV mode may not be performed.

As described above, the method for controlling a hybrid vehicle according to the present embodiment is a method for controlling the vehicle 100 including the engine 1, the power generating MG2 that is driven by the engine 1 and generates the electric power, the traveling MG3, and the battery 6 that is charged by the electric power generated by the power generating MG2 and supplies the electric power to the traveling MG3. In this control method, the controller 20 executes the state of charge reducing control in which the SOC of the battery 6 at the time when the vehicle reaches the destination is lower than the upper limit SOC by providing the section for executing the EV mode in which the engine 1 is stopped and the vehicle travels by the traveling MG3 until the vehicle reaches the destination. Further, during the execution of the state of charge reducing control, if the minimum engine coolant temperature Tclmin, which is an estimated value of a lowest temperature of the engine coolant until the vehicle reaches the destination, assuming that the EV mode is continued to the destination, is equal to or higher than the first threshold value, the controller 20 starts the EV mode when the EV mode is continuable to the destination and executes the EV mode until the vehicle reaches the destination. If the minimum engine coolant temperature Tclmin is lower than the first threshold value, the controller 20 shortens the section for executing the EV mode compared to when the minimum engine coolant temperature Tclmin is equal to or higher than the first threshold value. Accordingly, the decrease in engine coolant temperature Tcl is prevented, and thus the performance degradation of the heating device and the defroster device can be prevented.

In the present embodiment, the length of the section in which the EV mode is executed when the minimum engine coolant temperature Tclmin is lower than the first threshold value Tcl1 is the length that the vehicle travels so that the engine coolant temperature Tcl at the time of reaching the destination is equal to or higher than the first threshold value Tcl1. Accordingly, the performance of the heating device and the defroster device can be maintained until the vehicle reaches the destination.

In the present embodiment, when the minimum engine coolant temperature Tclmin is lower than the first threshold value Tcl1, the controller 20 delays a start timing of the EV mode by accordingly shortening the section for executing the EV mode. Accordingly, the engine 1 is not restarted during the execution of the EV mode, and the performance of the heating device and the defroster device can be maintained until the vehicles reaches the destination.

Second Embodiment

A second embodiment will be described. Although the present embodiment has the same configurations of the vehicle 100 and the controller 20 as the first embodiment, contents of state of charge reducing control are different. Hereinafter, this difference will be mainly described.

Figure 6:
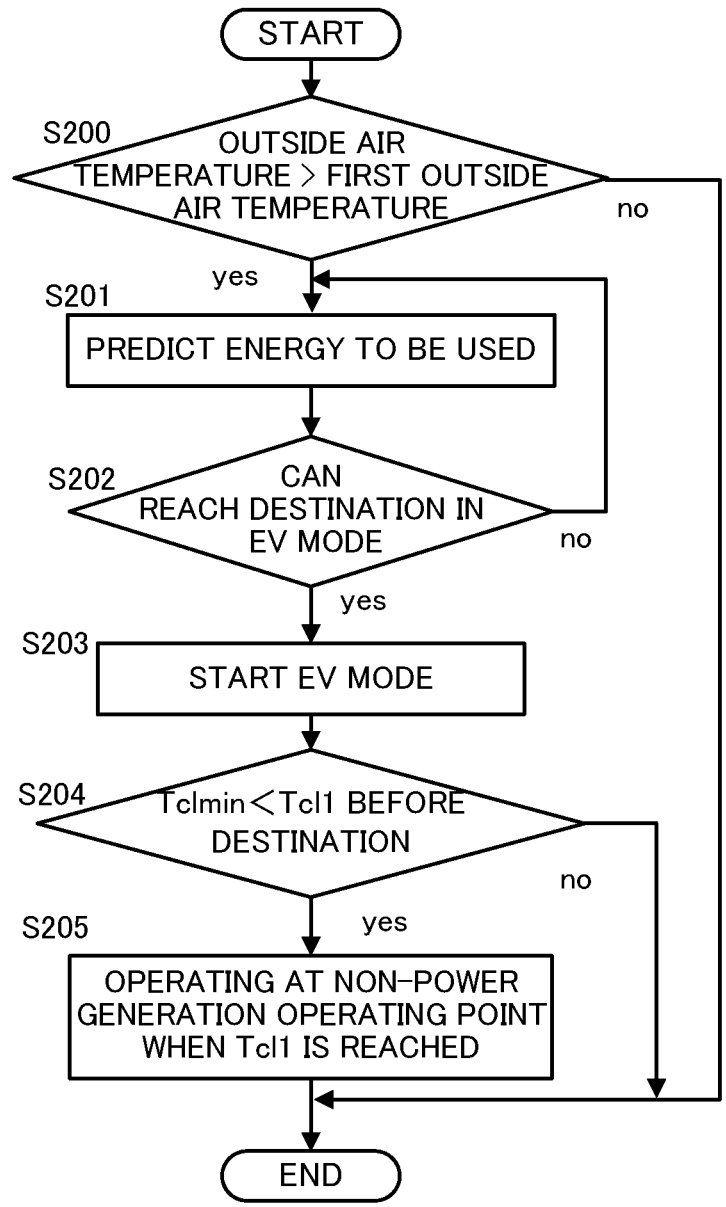
FIG. 6 is a flowchart of state of charge reducing control according to a second embodiment.

FIG. 6 is a flowchart showing a control routine of the state of charge reducing control according to the present embodiment. Steps S200 to S202 are the same as steps S100 to S102 according to the first embodiment, and thus a description thereof will be omitted.

The controller 20 starts the EV mode in step S203, and performs prediction and determination similar to step S103 of the first embodiment in subsequent step S204. Further, when the controller 20 determines that the minimum engine coolant temperature Tclmin falls below the first threshold value Tcl1 before the vehicle reaches a destination, the controller 20 executes a process of step S205. On the other hand, when the controller 20 determines that the minimum engine coolant temperature Tclmin is equal to or higher than the first threshold value Tcl1 before the vehicle reaches the destination, the controller 20 ends the present control routine as it is. That is, the EV mode is continued until the vehicle reaches the destination.

In step S205, when the engine coolant temperature Tcl reaches the first threshold value Tcl1, the controller 20 operates the engine 1 at a non-power generation operating point. The non-power generation operating point is an operating point at which power generation is not performed by the power generating MG2. For example, in the same control routine as an idling control of the engine 1, the engine 1 is operated at an operating point at which the power generation is not performed by the power generating MG2 and the engine coolant temperature Tcl is maintained at the first threshold value Tcl1. Accordingly, the engine coolant temperature Tcl can be maintained at the first threshold value Tell or more without increasing an SOC of the battery 6.

Figure 7:
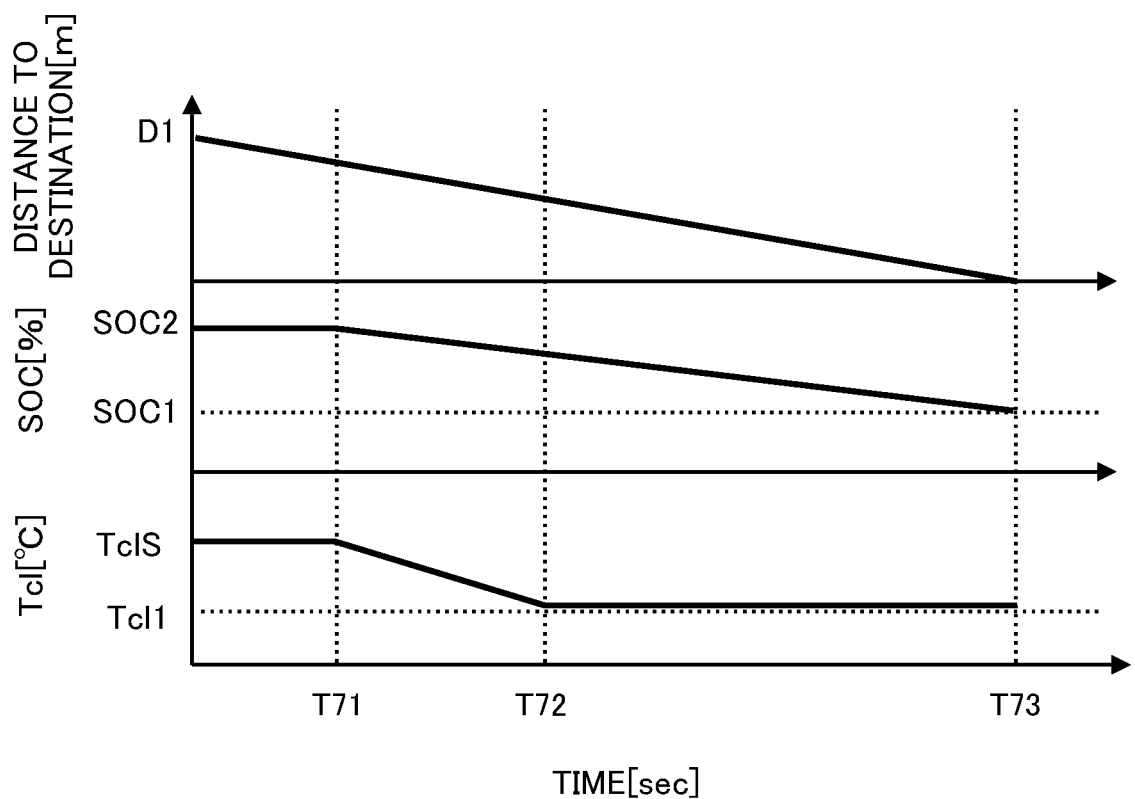
FIG. 7 is an example of a timing chart when the control in FIG. 6 is executed.

FIG. 7 is a timing chart when the state of charge reducing control according to the present embodiment is executed.

In the present embodiment, the EV mode is started at a timing T71 at which the vehicle can reach the destination in the EV mode. Further, when the engine coolant temperature Tcl reaches the first threshold value Tcl1 at a timing T72, the engine 1 is operated at a non-operating point from the timing T72 to a timing T73 at which the vehicle reaches the destination. That is, while a section in which the vehicle can travel in the EV mode is from the timing T71 to the timing T73, a section in which the EV mode is actually executed is shortened from the timing T71 to the timing T72. Further, the engine 1 operates at the non-power generation operating point after the timing T72. In other words, before the vehicle reaches a position at which the engine coolant temperature reaches the minimum engine coolant temperature Tclmin, the EV mode is executed in the section shorter than that when the minimum engine coolant temperature Tclmin is equal to or higher than the first threshold value Tcl1. Accordingly, the engine coolant temperature Tcl can be maintained at the first threshold value Tcl1 or more while reducing the SOC of the battery 6.

As described above, in the present embodiment, when the minimum engine coolant temperature Tclmin is lower than the first threshold value Tcl1, before the vehicle reaches the position at which the engine coolant reaches the minimum engine coolant temperature Tclmin, the controller 20 executes the EV mode in the section shorter than that when the minimum engine coolant temperature Tclmin is equal to or higher than the first threshold value Tcl1. Accordingly, it is possible to prevent the performance degradation of the heating device and the defroster device by performing the state of charge reducing control.

In the present embodiment, when the engine coolant temperature Tcl has decreased to the first threshold value Tcl1 during the execution of the EV mode, the controller 20 operates the engine at the operating point at which the power generating MG2 does not generate the electric power while the traveling is continued by the traveling MG3. Accordingly, it is possible to reduce the SOC of the battery 6 while maintaining the engine coolant temperature Tcl at the first threshold value Tcl1.

Third Embodiment

A third embodiment will be described. Although the present embodiment has the same configurations of the vehicle 100 and the controller 20 as the second embodiment, contents of state of charge reducing control are different. Hereinafter, this difference will be mainly described.

Figure 8:
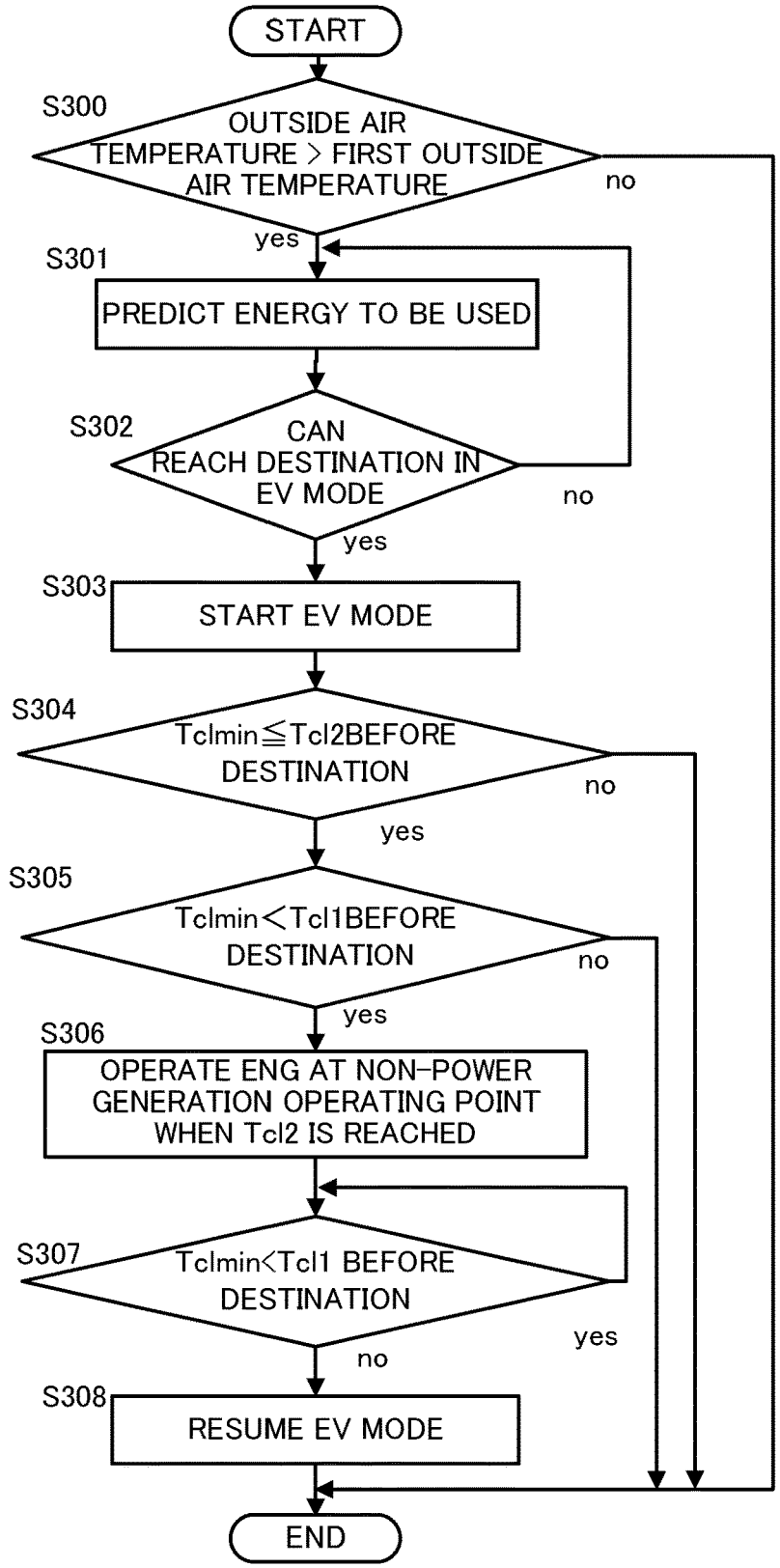
FIG. 8 is a flowchart of state of charge reducing control according to a third embodiment.

FIG. 8 is a flowchart showing a control routine of the state of charge reducing control according to the present embodiment. Steps S300 to S303 are the same as steps S200 to S203 according to the second embodiment, and thus a description thereof will be omitted.

In step S304, the controller 20 estimates the minimum engine coolant temperature Tclmin before the vehicle reaches a destination, and determines whether the minimum engine coolant temperature Tclmin is equal to or less than a second threshold value Tcl2. The second threshold value is set to a temperature higher than the first threshold value Tcl1. For example, the first threshold value Tcl1 is set to a temperature at which performance of a heating device and a defroster device can be ensured, but the driver may feel that the performance is insufficient, and the second threshold value is set to a temperature at which such possibility does not occur.

When the controller 20 determines that the minimum engine coolant temperature Tclmin is equal to or lower than the second threshold value Tcl2 before the vehicle reaches the destination, the controller 20 executes a process of step S305, and otherwise ends the present control routine as it is.

In step S305, similarly to step S204 according to the second embodiment, the controller 20 determines whether the minimum engine coolant temperature Tclmin falls below the first threshold value Tcl1 before the vehicle reaches the destination. Further, when the controller 20 determines that the minimum engine coolant temperature Tclmin falls below the first threshold value Tcl1, the controller 20 executes a process of step S306, and otherwise ends the present control routine as it is. That is, even when the minimum engine coolant temperature Tclmin is equal to or less than the second threshold value Tcl2 before the vehicle reaches the destination, the EV mode is continued until the vehicle reaches the destination as long as the minimum engine coolant temperature Tclmin can be maintained equal to or higher than the first threshold value at the time of reaching the destination.

In step S306, the controller 20 operates the engine 1 at a non-power generation operating point when the engine coolant temperature Tcl reaches the second threshold value Tcl2. The non-power generation operating point here is an operating point at which power generation is not performed by the power generating MG2 and the engine coolant temperature Tcl can be maintained at the second threshold value Tcl2.

In step S307, similarly to step S305, the controller 20 determines whether the minimum engine coolant temperature Tclmin falls below the first threshold value Tcl1 before the vehicle reaches the destination. This determination is repeated until the controller 20 determines that the minimum engine coolant temperature Tclmin does not fall below the first threshold value Tcl1 before the vehicle reaches the destination. Further, when the controller 20 determines that the minimum engine coolant temperature Tclmin does not fall below the first threshold value Tcl1 before the vehicle reaches the destination, the controller 20 resumes the EV mode in step S308.

Figure 9:
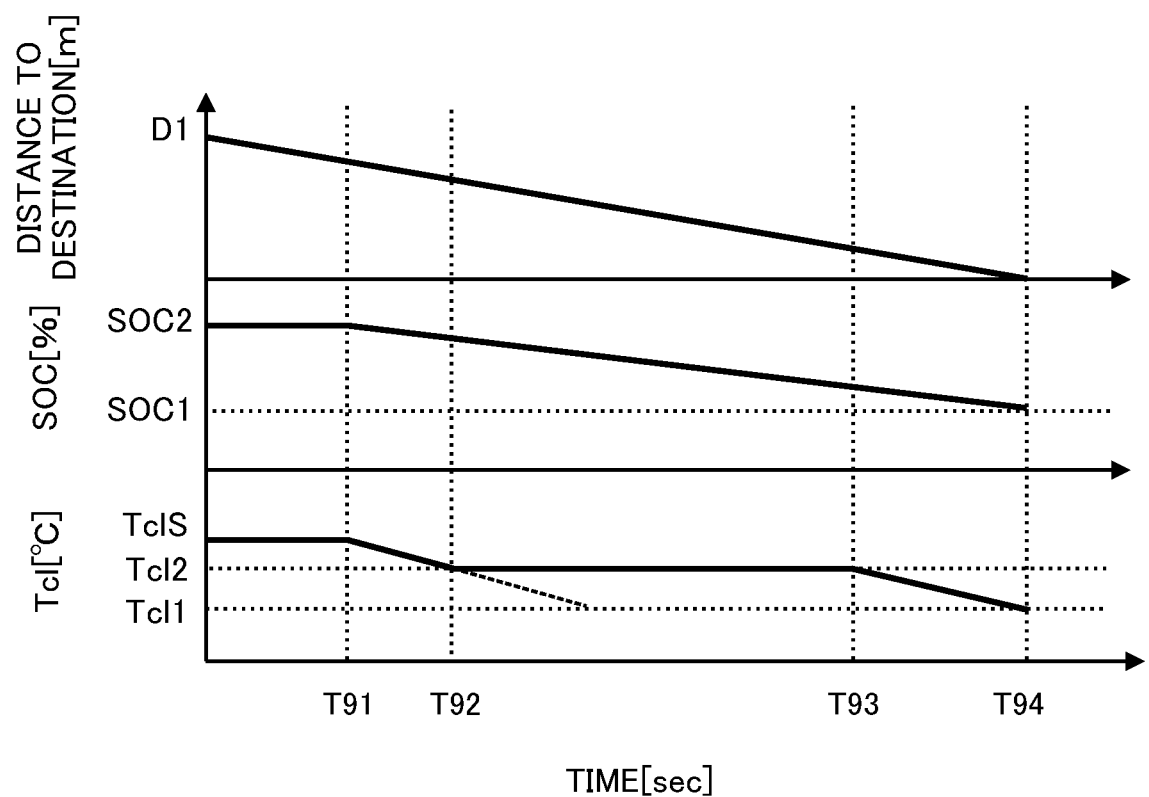
FIG. 9 is an example of a timing chart when the control in FIG. 8 is executed.

FIG. 9 is a timing chart when the state of charge reducing control according to the present embodiment is executed.

In the present embodiment, the EV mode is started at a timing T91 at which the vehicle can reach the destination in the EV mode. When the engine coolant temperature Tcl reaches the second threshold value Tcl2 at a timing T92, the engine 1 is operated at the non-power generation operating point, and the engine coolant temperature Tcl is maintained at the second threshold value Tcl2. Then, at a timing T93, when the controller 20 determines that the minimum engine coolant temperature Tclmin does not fall below the first threshold value Tcl1 even if the EV mode is executed until the vehicle reaches the destination, the EV mode is resumed, and the EV mode is continued until a timing T94 at which the vehicle reaches the destination. That is, while a section in which the vehicle can travel in the EV mode is from the timing T91 to the timing T94, a section in which the EV mode is actually executed is shortened from the timing T91 to the timing T92 and from the timing T93 to the timing T94. Further, in the section from the timing T92 to the timing T93, the engine coolant temperature Tcl is maintained at the second threshold value Tcl2.

As described above, in the present embodiment, in the case in which the engine coolant temperature Tcl drops to the second threshold value Tcl2 during the execution of the EV mode, the second threshold value Tcl2 being a temperature higher than the first threshold value Tcl1 and maintained by operating the engine 1 at the operating point at which the power generating MG2 does not generate the electric power, if the engine coolant temperature Tcl that is equal to or higher than the first threshold value Tcl1 can be maintained from there to the destination, the controller continues the EV mode, and if the engine coolant temperature Tcl that is equal to or higher than the first threshold value Tcl1 cannot be maintained, the controller operates the engine 1 at the operating point at which the power generating MG2 does not generate the electric power while the traveling is continued by the traveling MG3, and resumes the EV mode when the vehicle reaches a position where the engine coolant temperature Tcl equal to or higher than the first threshold value Tcl1 can be maintained until the vehicle reaches the destination. Accordingly, the engine coolant temperature Tcl can be maintained at the first threshold value Tcl1 or more until the vehicle reaches the destination while the SOC of the battery 6 is reduced. Furthermore, since there is a section in which the engine coolant temperature Tcl is maintained at the second threshold value Tcl2, performance degradation of the heating device and the defroster device due to a decrease in engine coolant temperature Tcl can be prevented.

Fourth Embodiment

A fourth embodiment will be described. Although the present embodiment has the same configurations of the vehicle 100 and the controller 20 as the third embodiment, contents of state of charge reducing control are different. Hereinafter, this difference will be mainly described.

Figure 10:
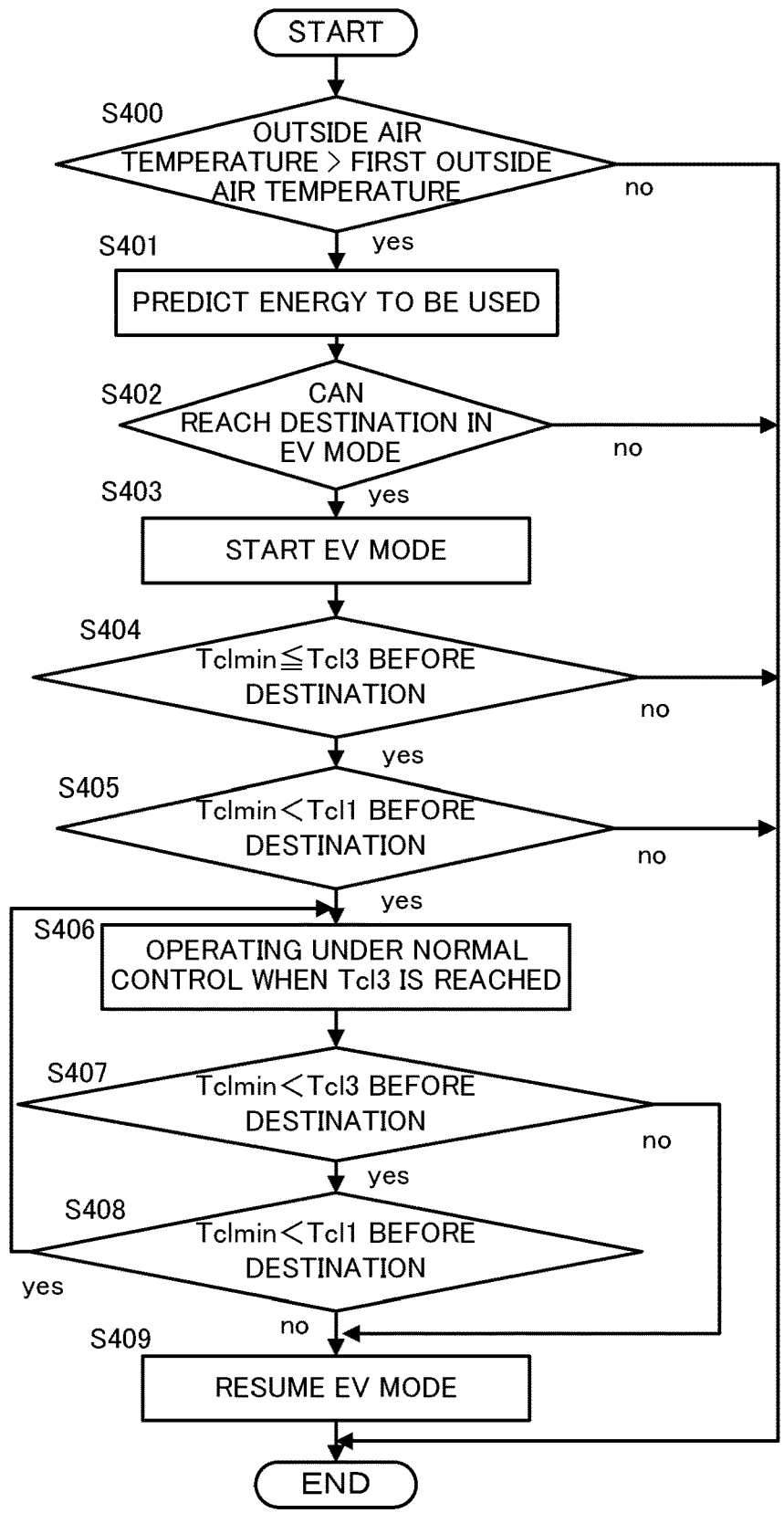
FIG. 10 is a flowchart of state of charge reducing control according to a fourth embodiment.

FIG. 10 is a flowchart showing a control routine of the state of charge reducing control according to the present embodiment. Steps S400 to S405 and steps S300 to S305 according to the third embodiment are the same except for threshold values used for determination in step S404 and step S304. In step S304, the minimum engine coolant temperature Tclmin is compared with the second threshold value Tcl2, whereas in step S404, the minimum engine coolant temperature Tclmin is compared with the third threshold value Tcl3. The third threshold value Tcl3 used in the present embodiment is the engine coolant temperature Tcl at which performance of a heating device and a defroster device is felt to be sufficient regardless of a driver. Therefore, the third threshold value Tcl3 can be replaced with the second threshold value Tcl2.

When the controller 20 determines in step S405 that the minimum engine coolant temperature Tclmin falls below the first threshold value Tcl1 before the vehicle reaches the destination, the controller 20 executes a process of step S406, and otherwise ends the present control routine as it is.

In step S406, when the engine coolant temperature Tcl reaches the third threshold value Tcl3, the controller 20 operates the engine 1 under normal control. That is, the power generating MG2 generates electric power by operation of the engine 1.

In step S407, similarly to step S404, the controller 20 estimates the minimum engine coolant temperature Tclmin before the vehicle reaches a destination, and determines whether the minimum engine coolant temperature Tclmin is equal to or less than the third threshold value Tcl3. When the controller 20 determines that the minimum engine coolant temperature Tclmin is equal to or less than the third threshold value Tcl3, the controller 20 executes a process of step S408, and otherwise executes a process of step S409.

In step S408, similarly to step S405, the controller 20 determines whether the minimum engine coolant temperature Tclmin falls below the first threshold value Tcl1 before the vehicle reaches the destination. If the controller 20 determines that the minimum engine coolant temperature Tclmin falls below the first threshold value Tcl1, the controller 20 returns to a process of step S406, and otherwise resumes the EV mode in step S409.

Figure 11:
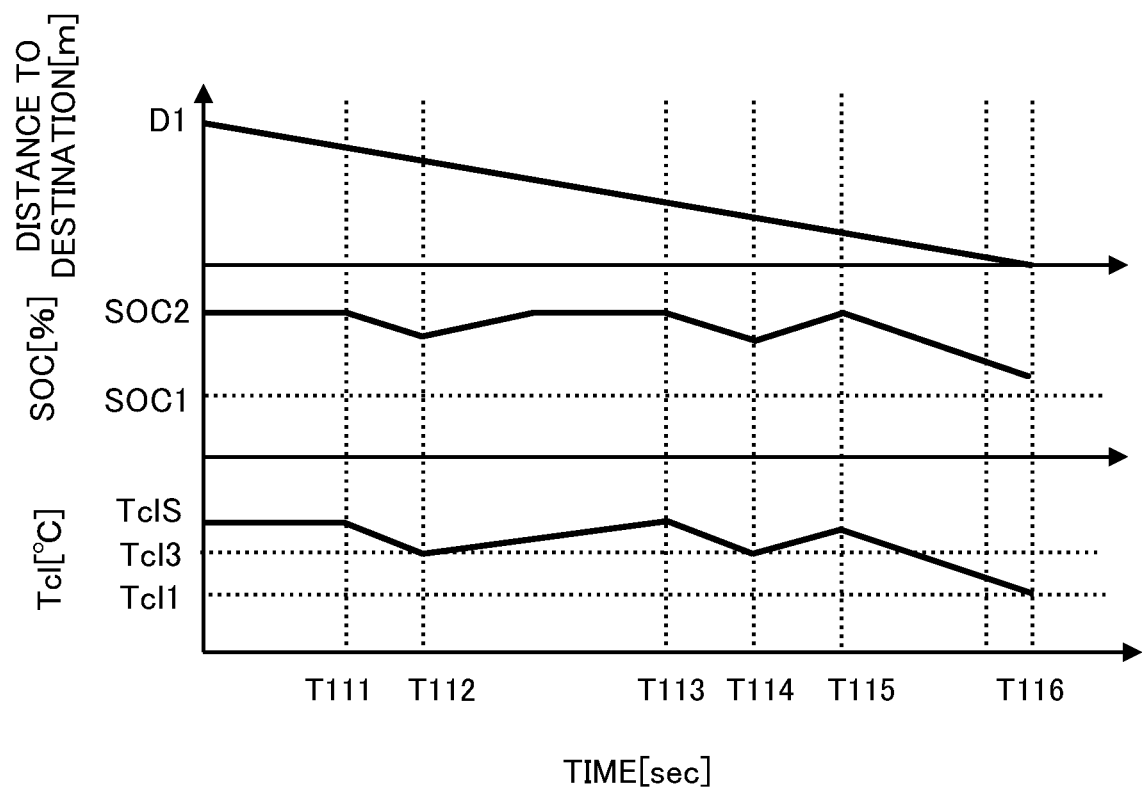
FIG. 11 is an example of a timing chart when the control in FIG. 10 is executed.

FIG. 11 is a timing chart when the state of charge reducing control according to the present embodiment is executed.

In the present embodiment, the EV mode is started at a timing T111 at which the vehicle can reach the destination in the EV mode, and when the engine coolant temperature Tcl reaches the third threshold value Tcl3 at a timing T112, the engine 1 is operated under the normal control. Then, at a timing T115, when the controller 20 determines that the minimum engine coolant temperature Tclmin does not fall below the first threshold value Tcl1 even if the EV mode is executed until the vehicle reaches the destination, the EV mode is resumed, and the EV mode is continued until a timing T116 at which the vehicle reaches the destination.

A section from the timing T112 to the timing T115 is repeated from the step S406 to the step S408 in FIG. 10. That is, since the engine 1 is operated under the normal control, in parallel with the present control routine, control is executed to stop the engine 1 when the engine coolant temperature Tcl rises to the reference temperature TclS, and to operate the engine 1 when the engine coolant temperature Tcl drops to the third threshold value Tcl3.

According to the state of charge reducing control according to the present embodiment, as in the third embodiment, the engine coolant temperature Tcl can be maintained at the first threshold value Tcl1 or more until the vehicle reaches the destination while the SOC of the battery 6 is reduced. Furthermore, since there is a section in which the engine coolant temperature Tcl is maintained at the third threshold value Tcl3, performance degradation of a heating device and a defroster device due to a decrease in engine coolant temperature Tcl can be prevented. However, in the present embodiment, the SOC of the battery 6 increases in a section in which the engine 1 is operated under the normal control, and thus there is a possibility that SOC of the battery 6 at the time of reaching the destination is higher than that in the case of the third embodiment. Therefore, the state of charge reducing control according to the present embodiment is executed in a case in which the driver selects the EV mode with the EV mode switch, a case in which the destination is set at which it is clear that the vehicle does not stay long enough for the engine 1 to be cold after reaching, or the like.

As described above, in the present embodiment, in the case in which the engine coolant temperature Tcl drops to the third threshold value Tcl3 during the execution of the EV mode, the third threshold value Tcl3 being a temperature higher than the first threshold value Tcl1 and satisfying a heating request and a defroster request, if the engine coolant temperature Tcl that is equal to or higher than the first threshold value Tcl1 can be maintained from there to the destination, the controller 20 continues the EV mode. On the other hand, if the engine coolant temperature Tcl that is equal to or higher than the first threshold value Tcl1 cannot be maintained, the controller operates the engine 1 under the normal control that repeats the operation and the stop according to the SOC of the battery 6 and the engine coolant temperature Tcl while the traveling is continued by the traveling MG3, and resumes the EV mode when the vehicle reaches a position where the engine coolant temperature Tcl equal to or higher than the first threshold value Tcl1 can be maintained until the vehicle reaches the destination. Accordingly, the engine coolant temperature Tcl can be maintained at the first threshold value Tcl1 or more until the vehicle reaches the destination while the SOC of the battery 6 is reduced. Furthermore, since there is the section in which the engine coolant temperature Tcl is maintained at the third threshold value Tcl3, the performance degradation of the heating device and the defroster device due to the decrease in engine coolant temperature Tcl can be prevented.

Although the embodiments of the present invention have been described above, the embodiments merely exemplify some of application examples of the present invention and do not intend to limit the technical scope of the present invention to the specific configurations of the embodiments.

The invention claimed is:

1. A method for controlling a hybrid vehicle, the hybrid vehicle including an engine, a power-generating motor generator that is driven by the engine and generates electric power, a traveling motor generator, and a battery that is charged by the electric power generated by the power-generating motor generator and supplies the electric power to the traveling motor generator, the method for controlling the hybrid vehicle comprising:
   executing, by a controller, a state of charge reducing control in which a state of charge of the battery at a time point at which the hybrid vehicle reaches a destination set by a driver is lower than an upper limit state of charge by providing a section for executing an EV mode in which the engine is stopped and the hybrid vehicle travels by the traveling motor generator until the hybrid vehicle reaches the destination, wherein
   during execution of the state of charge reducing control, when the hybrid vehicle is capable of reaching the destination in the EV mode,
   when an estimated value of a lowest temperature of an engine coolant until the hybrid vehicle reaches the destination, assuming that the EV mode is continued to the destination, is equal to or higher than a first threshold value, the controller starts the EV mode when the EV mode is continuable to the destination and executes the EV mode until the hybrid vehicle reaches the destination, and
   when the estimated value of the lowest temperature is lower than the first threshold value, the controller shortens a section for executing the EV mode compared to when the estimated value of the lowest temperature is equal to or higher than the first threshold value.

2. The method for controlling the hybrid vehicle according to claim 1, wherein a length of the section for executing the EV mode when the lowest temperature is lower than the first threshold value is a length with which a temperature of the engine coolant when the hybrid vehicle reaches the destination is equal to or higher than the first threshold value.

3. The method for controlling the hybrid vehicle according to claim 1, wherein, when the lowest temperature is lower than the first threshold value, the controller delays a start timing of the EV mode by accordingly shortening the section for executing the EV mode.

4. The method for controlling the hybrid vehicle according to claim 1, wherein, when the lowest temperature is lower than the first threshold value, the controller executes the EV mode in a section shorter than that when the lowest temperature is equal to or higher than the first threshold value before the hybrid vehicle reaches a position at which the engine coolant reaches the lowest temperature.

5. The method for controlling the hybrid vehicle according to claim 1, wherein, when a temperature of the engine coolant drops to the first threshold value during execution of the EV mode, the controller operates the engine at an operating point at which the power-generating motor generator does not generate electric power while traveling is continued by the traveling motor generator.

6. The method for controlling the hybrid vehicle according to claim 1, wherein
   in a case in which a temperature of the engine coolant drops to a second threshold value during execution of the EV mode, the second threshold value being a temperature higher than the first threshold value and maintained by operating the engine at an operating point at which the power-generating motor generator does not generate electric power,
   when the temperature of the engine coolant which is equal to or higher than the first threshold value is maintainable from there to the destination, the controller continues the EV mode, and
   when the temperature of the engine coolant which is equal to or higher than the first threshold value is not maintainable, the controller operates the engine at the operating point at which the power-generating motor generator does not generate electric power while traveling is continued by the traveling motor generator, and resumes the EV mode when the hybrid vehicle reaches a position at which the temperature of the engine coolant which is equal to or higher than the first threshold value is maintainable until the hybrid vehicle reaches the destination.

7. The method for controlling the hybrid vehicle according to claim 1, wherein
   in a case in which a temperature of the engine coolant drops to a third threshold value during execution of the EV mode, the third threshold value being a temperature higher than the first threshold value and satisfying a heating request and a defroster request, when the temperature of the engine coolant which is equal to or higher than the first threshold value is maintainable from there to the destination, the controller continues the EV mode, and when the temperature of the engine coolant which is equal to or higher than the first threshold value is not maintainable, the controller operates the engine under normal control in which operation and stop are repeated according to the state of charge and the temperature of the engine coolant while traveling is continued by the traveling motor generator, and resumes the EV mode when the hybrid vehicle reaches a position at which the temperature of the engine coolant which is equal to or higher than the first threshold value is maintainable until the hybrid vehicle reaches the destination.

8. A device for controlling a hybrid vehicle, the hybrid vehicle including an engine, a power-generating motor generator that is driven by the engine and generates electric power, a traveling motor generator, and a battery that is charged by the electric power generated by the power-generating motor generator and supplies the electric power to the traveling motor generator, the device for controlling the hybrid vehicle comprising:

a controller configured to execute a state of charge reducing control in which a state of charge of the battery at a time point at which the hybrid vehicle reaches a destination set by a driver is lower than an upper limit state of charge by providing a section for executing an EV mode in which the engine is stopped and the hybrid vehicle travels by the traveling motor generator until the hybrid vehicle reaches the destination, wherein during execution of the state of charge reducing control, when the hybrid vehicle is capable of reaching the destination in the EV mode, when an estimated value of a lowest temperature of an engine coolant until the hybrid vehicle reaches the destination, assuming that the EV mode is continued to the destination, is equal to or greater than a first threshold value, the controller starts the EV mode when the EV mode is continuable to the destination and executes the EV mode until the hybrid vehicle reaches the destination, and when the estimated value of the lowest temperature is lower than the first threshold value, the controller shortens a section for executing the EV mode compared to when the estimated value of the lowest temperature is equal to or higher than the first threshold value.

* * * * *